US007006979B1

(12) United States Patent
Samra et al.

(10) Patent No.: US 7,006,979 B1
(45) Date of Patent: *Feb. 28, 2006

(54) METHODS AND SYSTEMS FOR CREATING MODELS FOR MARKETING CAMPAIGNS

(75) Inventors: Balwinder S. Samra, Leeds (GB); Oumar Nabe, New York, NY (US)

(73) Assignee: General Electric Capital Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/474,588

(22) Filed: Dec. 29, 1999

(51) Int. Cl.
  *G06F 17/60* (2006.01)
(52) U.S. Cl. .................... 705/10; 705/1; 705/2; 705/3; 705/7; 705/27; 705/14; 705/26; 705/77; 707/1; 707/2; 707/9; 707/10; 707/100; 707/101; 707/102; 707/5; 707/6; 707/7; 235/375; 235/380; 235/381; 235/383; 463/25; 370/352
(58) Field of Classification Search ............... 705/10, 705/1, 2, 3, 7, 14, 26, 27, 77; 707/1, 2, 9, 707/10, 100–102, 5–7; 235/375, 383, 380, 235/381; 463/25; 370/352
See application file for complete search history.

(56) References Cited

U.S. PATENT DOCUMENTS

| 5,621,812 | A | 4/1997 | Deaton et al. |
|---|---|---|---|
| 5,638,457 | A | 6/1997 | Deaton et al. |
| 5,642,485 | A | 6/1997 | Deaton et al. |
| 5,644,723 | A | 7/1997 | Deaton et al. |
| 5,649,114 | A | 7/1997 | Deaton et al. |
| 5,675,662 | A | 10/1997 | Deaton et al. |
| 5,687,322 | A | 11/1997 | Deaton et al. |
| 5,774,868 | A | 6/1998 | Cragun et al. |
| 5,930,764 | A | * 7/1999 | Melchione et al. ........... 705/10 |
| 5,970,482 | A | * 10/1999 | Pham et al. ................... 706/16 |
| 6,026,397 | A | * 2/2000 | Sheppard ....................... 707/5 |
| 6,055,510 | A | 4/2000 | Henrick et al. |
| 6,061,658 | A | 5/2000 | Chou et al. |
| 6,070,147 | A | 5/2000 | Harms et al. |
| 6,078,891 | A | 6/2000 | Riordan et al. |
| 6,078,922 | A | 6/2000 | Johnson et al. |
| 6,119,933 | A | 9/2000 | Wong et al. |
| 6,202,210 | B1 | 3/2001 | Ludtke |
| 6,216,129 | B1 | 4/2001 | Eldering |
| 6,236,975 | B1 | 5/2001 | Boe et al. |
| 6,236,977 | B1 | 5/2001 | Verba et al. |
| 6,240,411 | B1 | 5/2001 | Thearling |
| 6,285,983 | B1 | 9/2001 | Jenkins |
| 6,307,958 | B1 | 10/2001 | Deaton et al. |

(Continued)

FOREIGN PATENT DOCUMENTS

JP     02001282591 A   * 10/2001

OTHER PUBLICATIONS

Kroenke, David M. Database Processing: Fundamentals, Design, and Implementation, (c) 1988-2000. Prentice-Hall, New Jersey, pp. 386-392. Textbook.*

(Continued)

*Primary Examiner*—James A Reagan
(74) *Attorney, Agent, or Firm*—Armstrong Teasdale LLP

(57) ABSTRACT

Methods and systems for increasing efficiency of a marketing campaign are disclosed. The method uses a system including a database containing customer demographic data and includes the steps of building models of predicted customer profiles and generating scores for prospective customers in the database based on predicted customer profiles.

21 Claims, 8 Drawing Sheets

U.S. PATENT DOCUMENTS 6,327,572 B1    12/2001    Morton et al.
6,334,110 B1    12/2001    Walter et al.

OTHER PUBLICATIONS

Robert R. Jackson and Paul Wang; *Strategic Database Marketing*; 1996 Printing; Published by NTC Business Books, a division of NTC Publishing Group, Lincolnwood, IL USA, copyright 1994; pp. 26-31; 38-45; 86-87; 118-123; 130-135; 158-165; 172-185.

Edward L. Nash; *Database Marketing*, copyright 1993, McGraw-Hill, Inc., USA; pp. 41-43; 90-91; 128-137; 139-163.

Julie Bort; Data Mining's Midas Touch; *InfoWorld*; vol. 18, Issue 18, start p. 79; Apr. 29, 1996.

Richard Cross; Profiting from Database Marketing; *Direct Marketing*, vol. 54, Issue 5, start p. 24; Sep., 1991.

American Banker; Database Marketing: Improving Service and Profitability By Segmenting Customers; vol. 163, Issue 176, start p. 30A, Sep. 15, 1998.

http://proquest.umi.com; Barry de Ville; "Direct Marketing With ModelMax"; Software Review; *Marketing Research*; Chicago; Spring 1996; 4 pgs.

Microsoft Press Computer Dictionary; published by Microsoft Press; copyright 1997; 4 pgs.

http//www.cs.uregina.ca/~dbd/cs831/notes/lift_chart/lift_chart.html; "Cumulative Gains and Lift Charts";Apr. 9, 2002; 5 pgs.

\* cited by examiner

METHODS AND SYSTEMS FOR CREATING MODELS FOR MARKETING CAMPAIGNS

BACKGROUND OF THE INVENTION

This invention relates generally to marketing and, more particularly, to methods and systems for identifying and marketing to segments of potential customers.

Typical marketing strategies involve selecting a particular group based on demographics or other characteristics, and directing the marketing effort to that group. Known methods typically do not provide for proactive and effective consumer relationship management or segmentation of the consumer group to increase efficiency and returns on the marketing campaign. For example, when a mass mailing campaign is used, the information used to set up the campaign is not segmented demographically to improve the efficiency of the mailing. The reasons for these inefficiencies include the fact that measurement and feedback is a slow manual process that is limited in the depth of analysis. Another reason is that data collected from different consumer contact points are not integrated and thus does not allow a marketing organization a full consumer view.

Results of this inefficient marketing process include loss of market share, increased attrition rate among profitable customers, and slow growth and reduction in profits.

BRIEF SUMMARY OF THE INVENTION

Marketing campaign systems and methods to increase efficiency of a marketing campaign are disclosed. The method uses a system including a database containing customer demographic data and includes the steps of building models of predicted customer profiles and generating scores for prospective customers in the database based on predicted customer profiles.

DETAILED DESCRIPTION OF THE INVENTION

Exemplary embodiments of processes and systems for integrating targeting information to facilitate identifying potential sale candidates for marketing campaigns are described below in detail. In one embodiment, the system is internet based. The exemplary processes and systems combine advanced analytics, On Line Analytical Processing (OLAP) and relational data base systems into an infrastructure. This infrastructure gives users access to information and automated information discovery in order to streamline the planning and execution of marketing programs, and enable advanced customer analysis and segmentation of capabilities.

The processes and systems are not limited to the specific embodiments described herein. In addition, components of each process and each system can be practiced independent and separate from other components and processes described herein. Each component and process can be used in combination with other components and processes.

Figure 1:
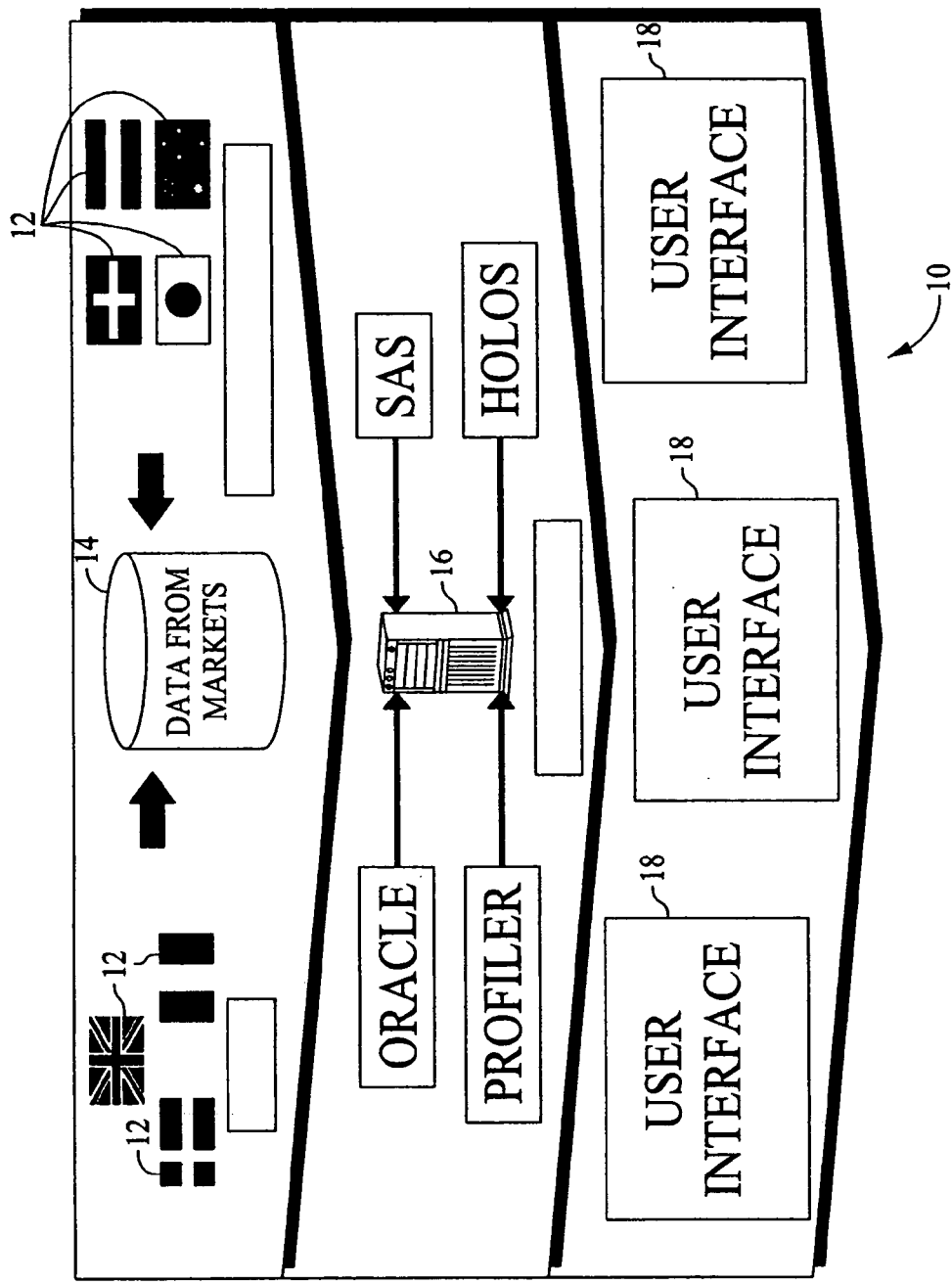
FIG. 1 is a block diagram of an exemplary embodiment of a web-based global modeling architecture.

FIG. 1 is a block diagram of an exemplary embodiment of a web-based global modeling architecture 10. Data from various international markets 12 is compiled in a consumer database 14. Consumer database 14 contains user defined information such as age, gender, marital status, income, transaction history, and transaction measures. Customer database 14 is accessible by a server 16. Server 16 stores the consumer database 14 in a relational database such that the consumer data is accessible to a targeting engine (not shown in FIG. 1) which takes data input and based upon modeling generates user interfaces 18. Architecture 10 may also be client/server based.

Figure 2:
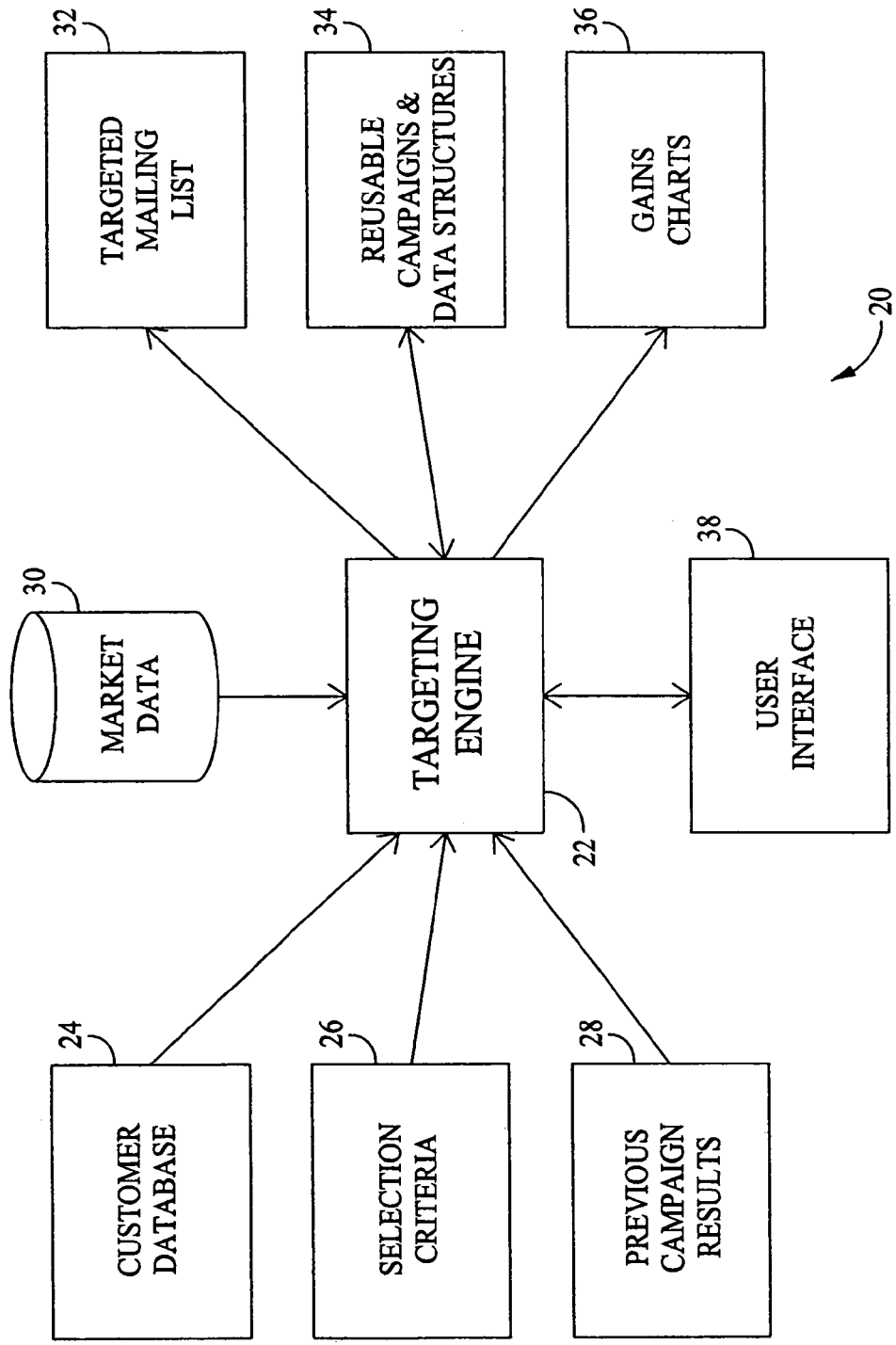
FIG. 2 is a block diagram of an exemplary embodiment of a targeting engine.

FIG. 2 illustrates a marketing system 20. Included in marketing system 20 are a targeting engine 22 and a plurality of data inputs and outputs. Data inputs include a customer database 24, selection criteria 26, previous campaign results 28 and marketing data 30. Targeting engine 22 generates targeting mailing lists 32, campaign and data structures 34 and gains charts 36. Historical campaign and data structures 34 are reusable by targeting engine 22. Targeting engine 22 also generates outputs to a user interface 38, typically in a graphic format. Targeting engine 22 streamlines the planning and execution of marketing programs and enables advanced customer analysis and segmentation capabilities. Targeting engine 22 further delivers information in a proactive and timely manner to enable a user to gain a competitive edge. Targeting engine 22 accomplishes these goals through the use of models.

Models

Models are predicted customer profiles based upon historic data. Any number of models can be combined as an OLAP cube which takes on the form of a multi dimensional structure to allow immediate views of dimensions including for example, risk, attrition, and profitability.

Models are embedded within targeting engine 22 as scores associated with each customer, the scores can be combined to arrive at relevant customer metrics. In one embodiment, models used are grouped under two general categories, namely marketing and risk. Examples of marketing models include: a net present value/profitability model, a prospect pool model, a net conversion model, an early termination (attrition) model, a response model, a revolver model, a balance transfer model, and a reactivation model. A propensity model is used to supply predicted answers to questions such as, how likely is this customer to: close out an account early, default, or avail themselves to another product (cross-sell). As another example, profitability models guide a user to optimized marketing campaign selections based on criteria selected from the consumer database 24. A payment behavior prediction model is included that estimates risk. Other examples of risk models are a delinquency and bad debt model, a fraud detection model, a bankruptcy model, and a hit and run model. In addition, for business development, a client prospecting model is used. Use of models to leverage consumer information ensures right value propositions are offered to the right consumer at the right time by tailoring messages to unique priorities of each customer.

Targeting Engine

Targeting engine 22 combines the embedded models described above to apply a score to each customer's account and create a marketing program to best use such marketing resources as mailing, telemarketing, and internet online by allocating resources based on consumer's real value. Targeting engine 22 maintains a multi-dimensional customer database based in part on customer demographics. Examples of such customer related demographics are: age, gender, income, profession, marital status, or how long at a specific address. When applied in certain countries, that fact that a person is a foreign worker could be relevant. The examples listed above are illustrative only and not intended to be exhaustive. Once a person has been a customer, other historical demographics can be added to the database, by the sales force, for use in future targeting. For example, what loan products a customer has previously purchased is important when it comes to marketing that person a product in the future in determining a likelihood of a customer response. To illustrate, if a person has purchased an automobile loan within the last six months, it probably is unreasonable to expend marketing effort to him or her in an automobile financing campaign.

However a cash loan or home equity loan may still be of interest to the automobile loan purchaser. In deciding whether to market to him or her, other criteria that has been entered into the targeting engine 22 database in the form of a transaction database can be examined. The transaction database contains database elements for tracking performance of previously purchased products, in this case the automobile loan. Information tracked contains, for example, how often payments have been made, how much was paid, in total and at each payment, any arrears, and the percentage of the loan paid. Again the list is illustrative only. Using information of this type, targeting engine 22 can generate a profitability analysis by combining models to determine a probability score for response, attrition and risk. Customers are rank ordered by probability of cross-sell response, attrition, risk, and net present value. For example, if a consumer pays a loan off within a short time, that loan product was not very profitable. The same can be said of a product that is constantly in arrears. The effort expended in collection efforts tends to reduce profitability.

When a marketer embarks on a campaign, they will input into targeting engine the desired size of the campaign. Using 60,000 as an example, the marketer inputs the target consumer selection criteria 26, some subset of the demographics listed above, into targeting engine 22.

Targeting engine uses the stored databases and generates a potential customer list based on scores based on demographics and the propensity to buy another loan product and expected profitability. Customers can be targeted by the particular sales office, dealers, product type, and demographic profile. Targeting engine enables a user to manipulate and derive scores from the information stored within the consumer and structure databases. These scores are used to rank order candidate accounts for marketing campaigns based upon model scores embedded within the consumer and structure databases and are used in a campaign selection. Scores are generated with a weight accorded the factors, those factors being the demographics and the models used. Using the scores and profitability targeting engine generates a list of potential profitable accounts, per customer and/or per product, in a rank ordering from a maximum profit to a zero profit versus cost.

Figure 7:
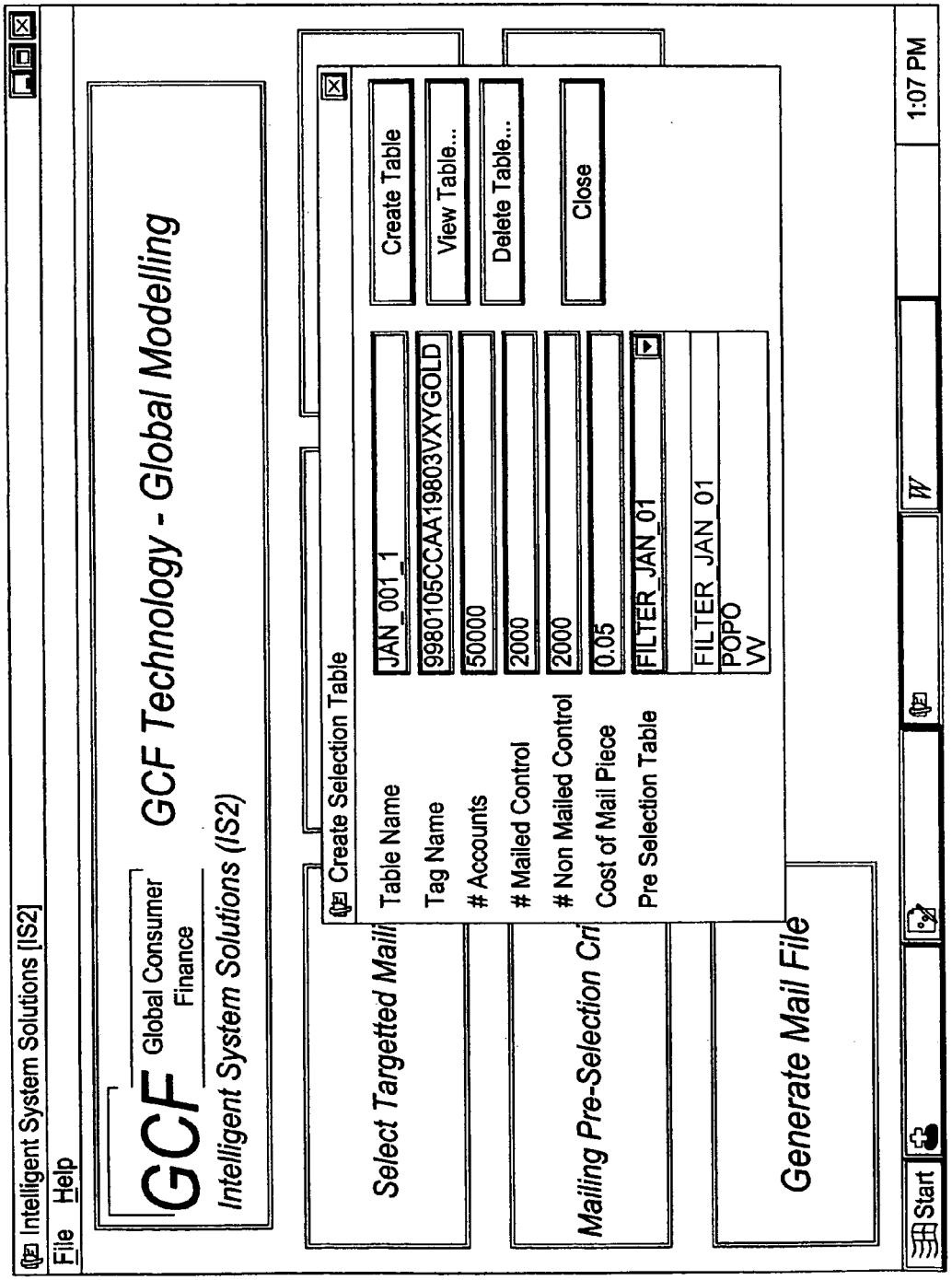
FIG. 7 is an exemplary user interface for creation of a selection table.

As candidate accounts are ranked by a selected model score, targeting engine 22 (shown in FIG. 2) performs calculations at which marginal returns become zero, and the user is alerted to an optimal mailing depth which can override initial manually selected campaign size to form a marketing campaign customer list. The selected marketing campaign results in a database table which has the customer identification number, relevant model scores, flags that indicate whether the customer is a targeted or a random selection, and an indicator for the product offered. As shown in FIG. 7, a user can use a user interface 80 to choose a particular database table. As an example, targeting engine 22 may determine that a mailing of 40,000 units, as opposed to the requested 60,000 units, is the maximum profitable for the example campaign. Conversely, targeting engine 22 may also determine that, for the requested campaign, 100,000 units have profit potential and will flag that information to the marketer. To arrive at expected profitability numbers, targeting engine 22, has the capability to deduct costs, such as mailing cost, from a proposed campaign.

Graphical User Interface

Figure 3:
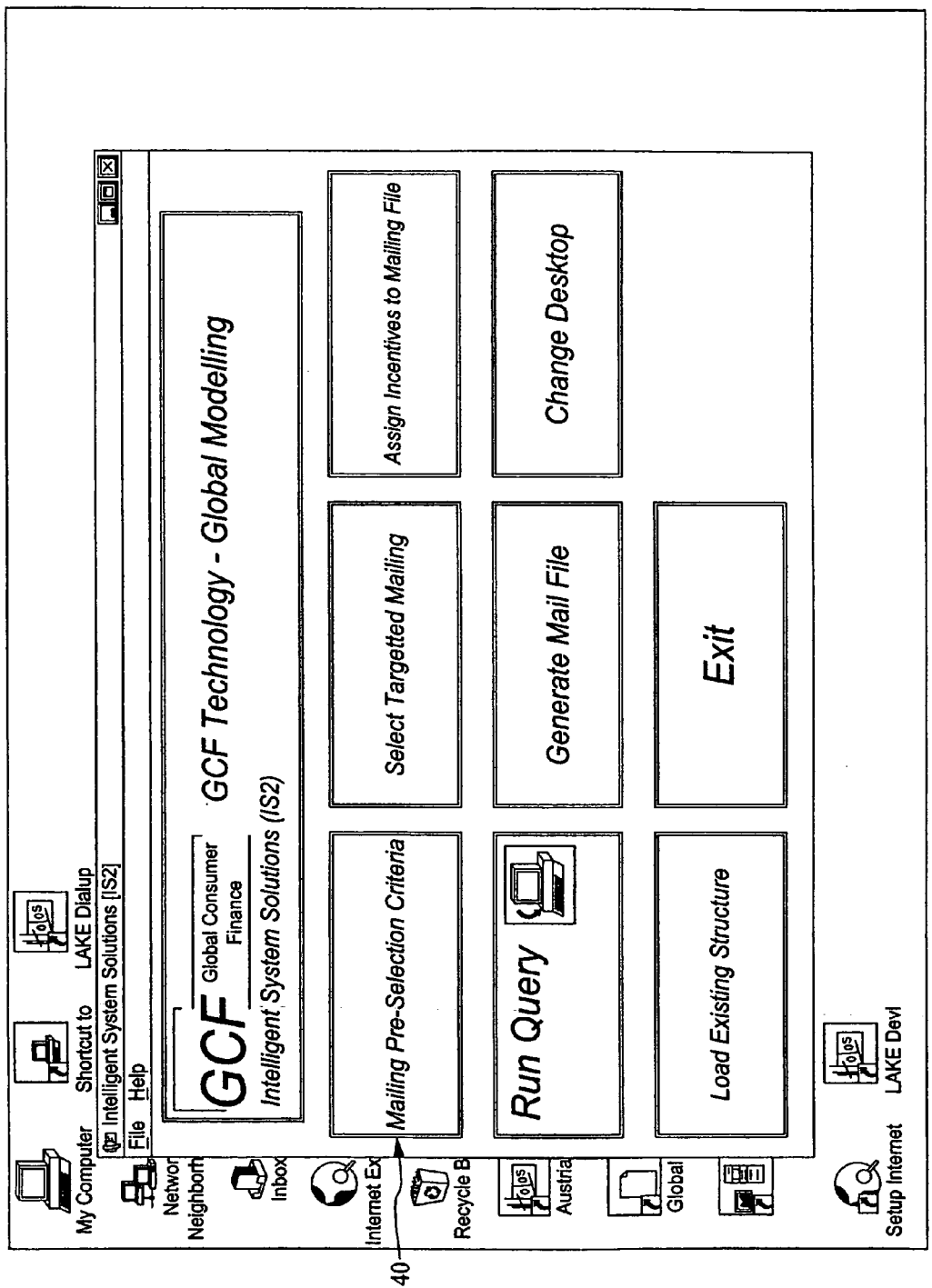
FIG. 3 is an exemplary graphical user interface for pre-selecting mailing criteria.
Figure 4:
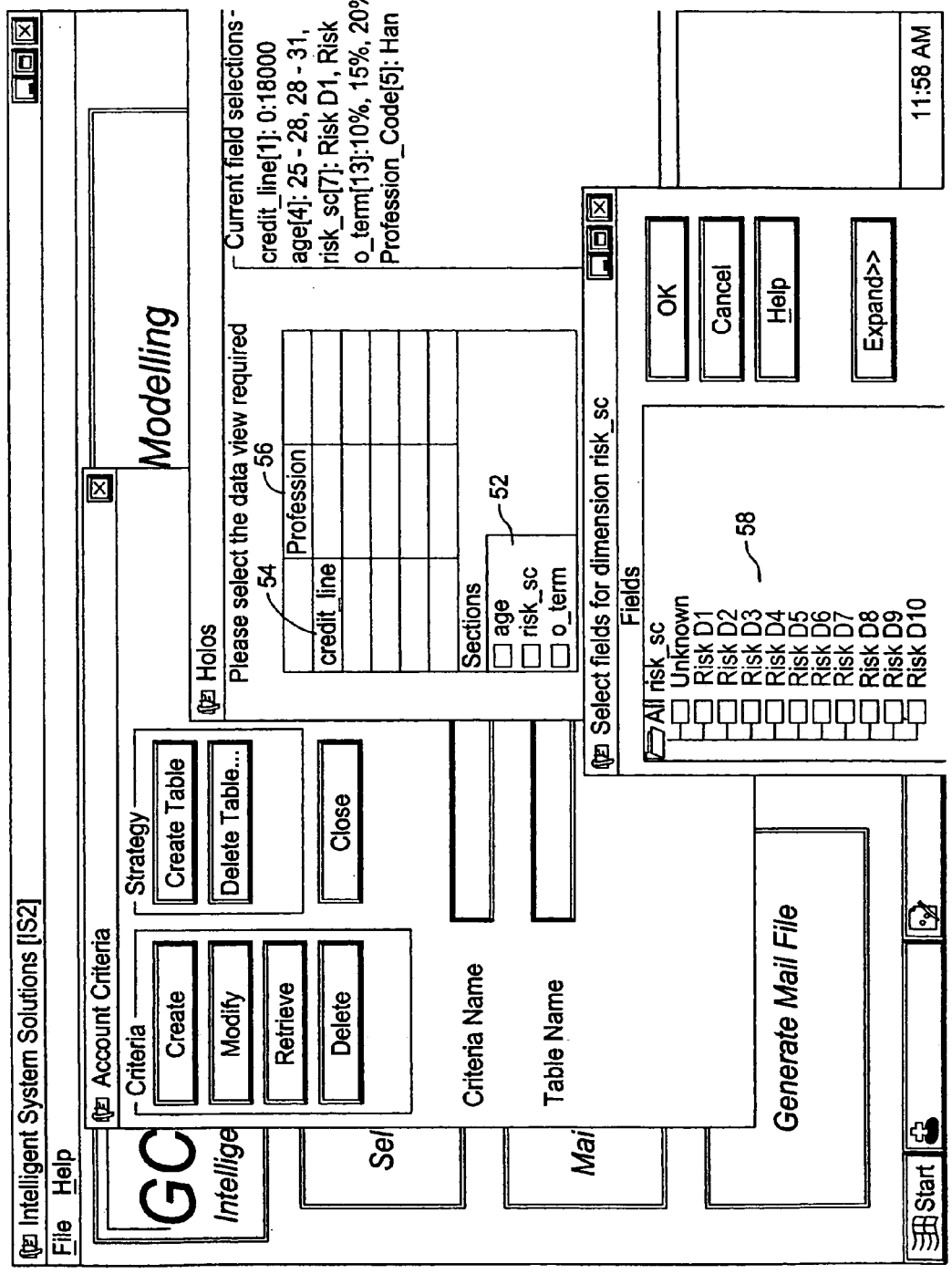
FIG. 4 is an exemplary user interface for the input of marketing criteria.

Users input the target consumer selection criteria 26 into targeting engine 22 through a simple graphical user interface 38. An exemplary example of a graphical user interface is shown in FIG. 3. In this exemplary example, one of the options available to a user is to input pre-selection criteria for a mailing campaign 40. Once the user selects the mailing pre-selection criteria 40 option, another user interface 50, one possible example is FIG. 4, allows the user to input the marketing criteria. Example marketing criteria shown are age 52, credit line 54, a profession code 56, and a plurality of risk factors 58.

Once a user has input the marketing campaign pre-selection criteria into targeting engine, that criteria is retained by a targeting engine database. Details of all available criteria are retained as entries in a database table and duplication of previous efforts is avoided.

Figure 5:
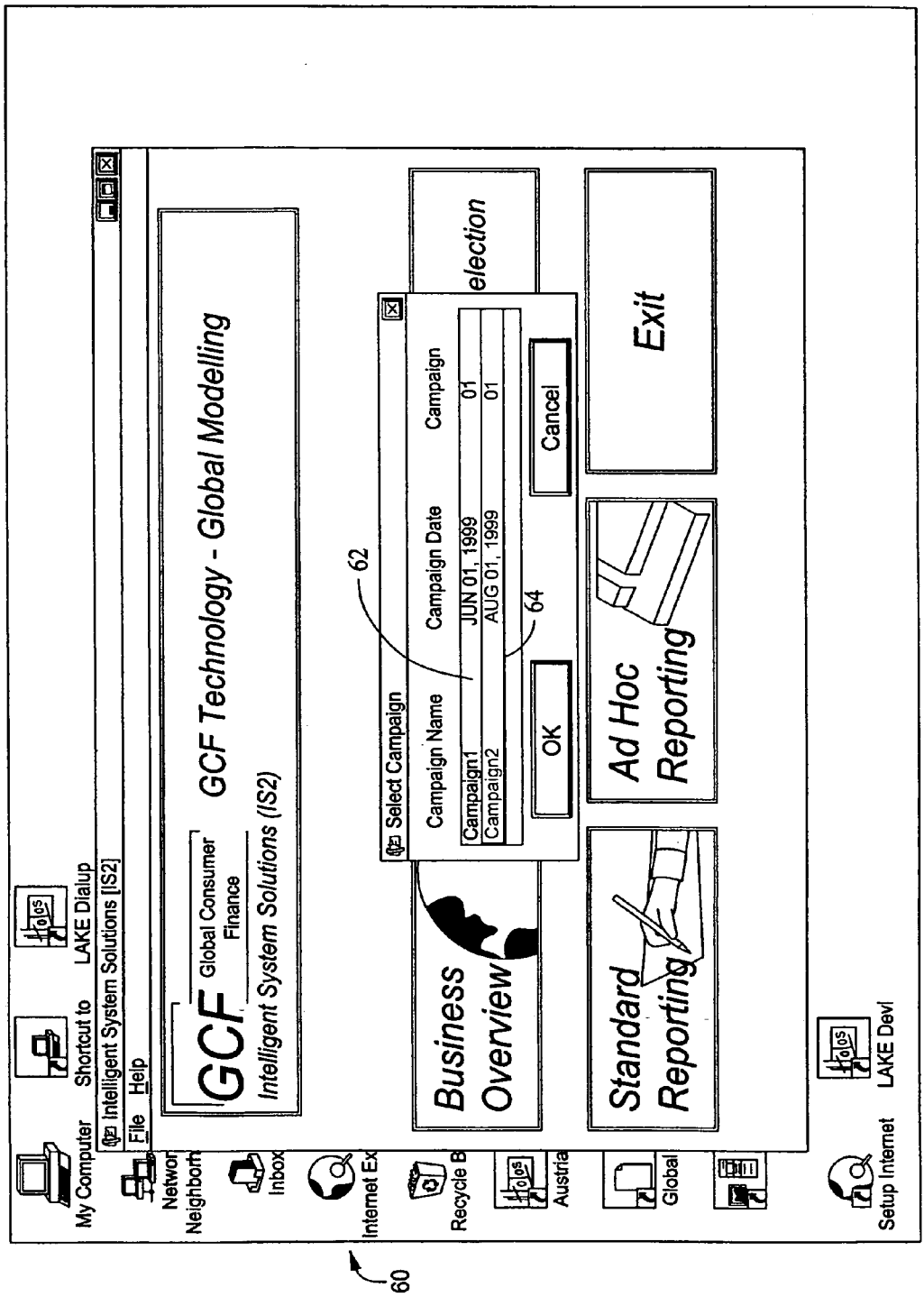
FIG. 5 is an exemplary user interface for selection of structures.
Figure 6:
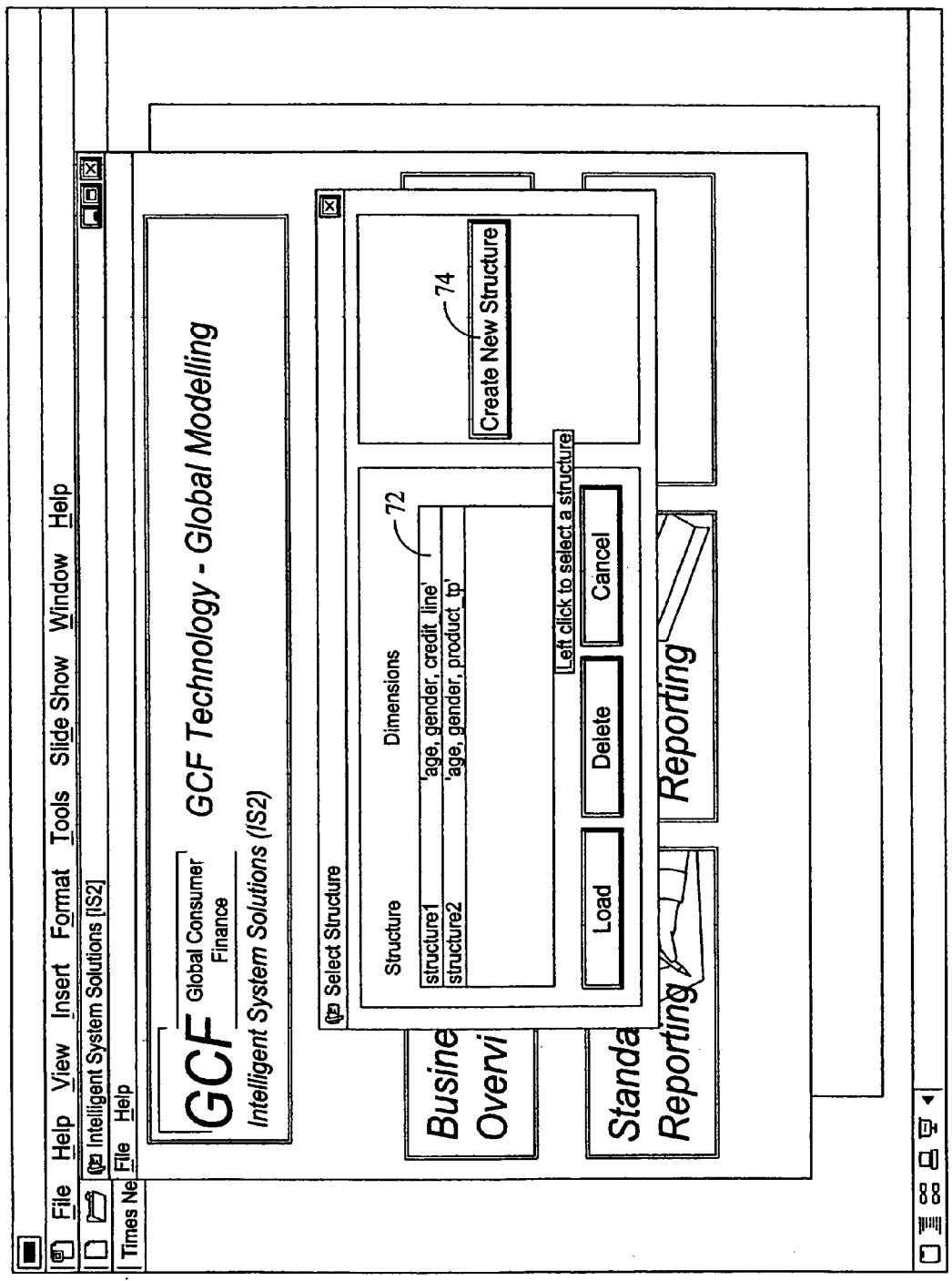
FIG. 6 is an exemplary user interface for selection of campaigns.

Marketing campaigns can be stored within targeting engine 22. An exemplary example showing a graphical interface 60 used to choose previous marketing campaigns is shown in FIG. 5. In this example, a user can choose between Campaign1 62 and Campaign2 64. FIG. 6 is a user interface 70 showing structures associated with Campaign2 64. Structure1 72 indicates that analysis of the campaign based on age, gender, credit line and the targeting model is available. Users can build new structures on an ad-hoc basis by choosing the Create New Structure 74 on user interface 70. By stacking structures of different campaigns in chronological order trends within segments can be discerned. As a result of the storage of marketing campaign structures within targeting engine database, those structures having time as one of the database elements allow a user to define trends whereby a marketing campaign history structure which is automatically analyzed by targeting engine 22.

Trend Analysis

A trend analysis is a way to look at multiple marketing campaigns over time and is also a way to evaluate the models used and define trends. As an example of trend analysis, the user can determine where a response rate has been changing or where profitability has been changing or look at the number of accounts being closed. A user can also analyze particular population segments over time.

Trend analysis can be used to track how a particular segment, males from age 25–35 with an auto loan for example, may change in a propensity to avail themselves to other loan products over time.

Campaign Analysis

A user can create marketing test cells in the targeted accounts. Test cells are created using a range of selection criteria and random assignments. Accounts satisfying selection criteria are counted. A marketing cell code for each account is assigned in the campaign table. The user can then output the contents of the campaign table to a file that can be exported to print a campaign mailing.

A user can profile selected accounts and assign a score for any campaign against a list of user defined dimensions. Assigning a score allows results to be rank ordered. Profiling shows how targeted accounts differ from non-selected accounts and is used to ensure the campaign is reaching the target base of the campaign. Profiling dimensions are selected during the initial customization process. Profiling can be done directly on a portfolio without any reference to marketing campaigns.

Targeting engine 22 also accepts marketing campaign results based upon each customer. Additional information can be appended onto the marketing campaign result files that become part of the consumer database. Exemplary examples of information that is added to the marketing campaign result files are: loan size, loan terms, and risk score. Campaign analysis is done by comparing the original marketing campaign customer list against marketing campaign results. Targeting engine 22 then profiles this comparison information to construct gains charts.

Maintaining feedback into targeting engine 22 improves subsequent modeling cycles. In the 60,000 example campaign explained previously, assume the size of the actual campaign after targeting engine applied a model was 40,000 mailings. Information regarding who responded and how much was lent, for example, is input into targeting engine. Analysis facilitates a determination of how good the model performed when it told the marketer 40,000 mailings was the optimal campaign size. Analysis is accomplished in one embodiment by the use of gains charts. As an example, the gains charts for the 40,000 mailings campaign may indicate that a mailing to 10% of the group may actually obtain 20% of all potential responders.

Figure 8:
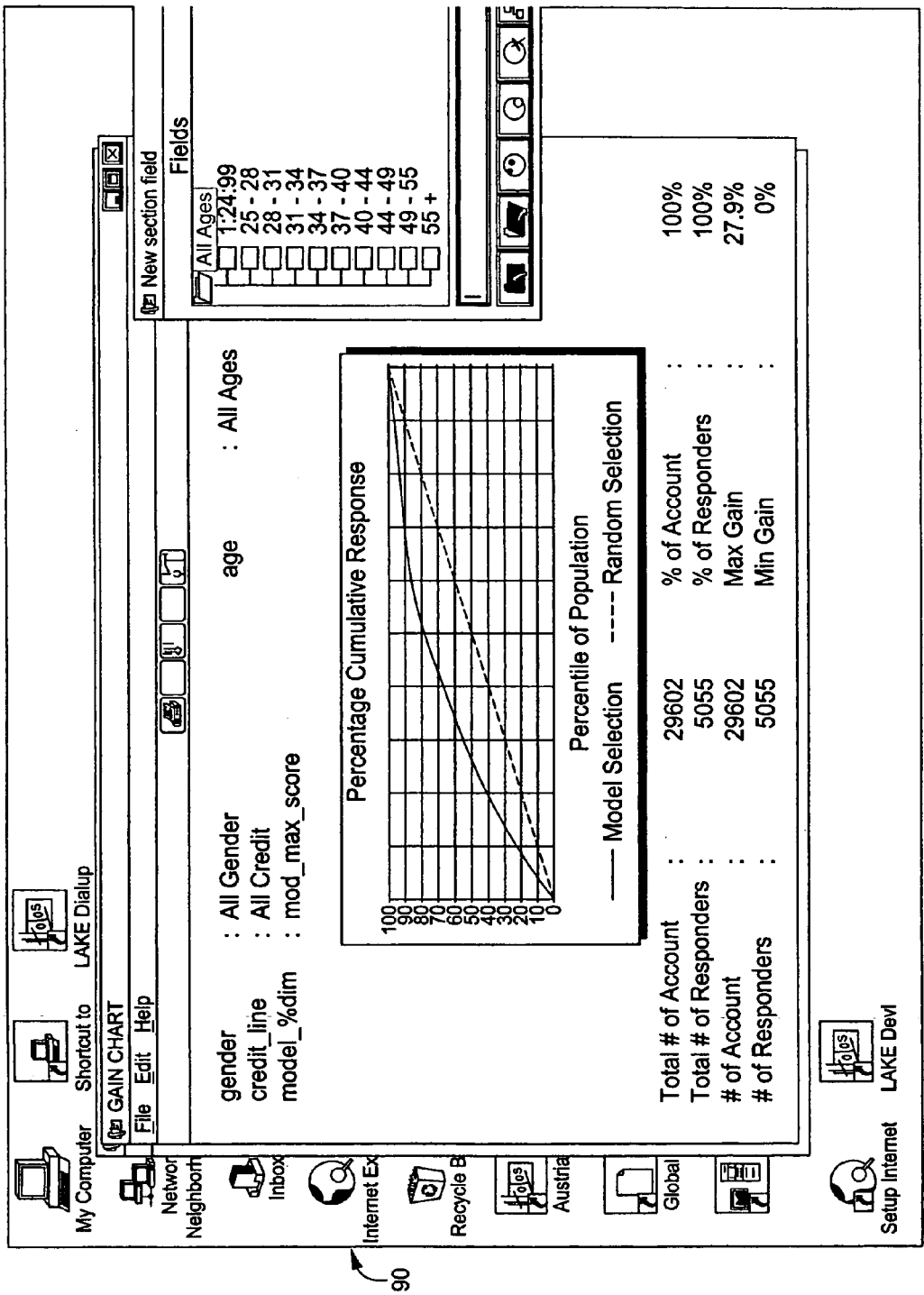
FIG. 8 is an exemplary user interface for a gains chart.

An exemplary gains chart is displayed on the user interface 90 shown in FIG. 8. As shown in FIG. 8, when models are used to generate prospective customers for a marketing campaign, a larger number of responses per campaign size is generated, thereby increasing the efficiency of the marketing campaign and identifying risks such as delinquency and fraud. A gains chart approach allows a user to track performance of models used over several marketing campaigns and therefore allows a user to show where the model works best and where the performance of the model need to be addressed.

Scores for customer accounts are generated as a part of a campaign analysis. Models are used to assign a score to an account as a result of a completed campaign.

While the invention has been described in terms of various specific embodiments, those skilled in the art will recognize that the invention can be practiced with modification within the spirit and scope of the claims. For example, although the above embodiments have been described in terms of a mailing campaign, the methods and systems described above are applicable to internet E-mail based campaigns and telemarketing campaigns.

What is claimed is:

1. A method for increasing efficiency of a marketing system, the system comprising a database containing a plurality of prospective customers and customer demographic data, said method including the steps of:

building models of predicted customer profiles, the models include risk models and marketing models, each model is a statistical analysis for predicting a behavior of a prospective customer to a marketing campaign, wherein a risk model predicts a likelihood of whether the prospective customer will at least one of pay on time, be delinquent with a payment, and declare bankruptcy, and wherein the marketing models include a net present value/profitability model, a prospect pool model, a net conversion model, an attrition model, a response model, a revolver model, a balance transfer model, and a reactivation model;

embedding the models within an online analytical processing tool;

using the online analytical processing tool and the customer demographic data to analyze a combination of the models, each model combination includes a risk model and at least one of the marketing models;

determining a sequential order for combining the models prior to combining the models based on the model combination analysis performed by the online analytical processing tool;

using the online analytical processing tool to combine the models in the determined sequential order, wherein combining the models in the determined sequential order includes defining a target group of prospective customers from the plurality of prospective customers stored in the database, the target group including a list of prospective customers satisfying each of the combined models, the determined sequential order maximizes a number of prospective customers included within the target group; and generating scores for each prospective customer included within the target group based on the predicted customer profiles wherein the online analytical processing tool generates the scores by combining the models in the determined sequential order, the scores representing at least one of a probable response by a customer to the marketing campaign, attrition of the customer, and risk associated with the customer.

2. A method according to claim 1 wherein said step of generating scores for a prospective customer further comprises the step of using the online analytical processing tool that combines models in the form of a multidimensional structure.

3. A method according to claim 1 wherein said step of generating scores for a prospective customer further comprises the step of using the online analytical processing tool with dimensions comprising risk, attrition, and profitability.

4. A method according to claim 1 wherein said step of building models of predicted customer profiles further comprises the step of using a propensity model to supply predicted answers to questions.

5. A method according to claim 4 wherein said step of building models of predicted customer profiles further comprises the step of using a propensity model to determine how likely a customer is to close an account early.

6. A method according to claim 4 wherein said step of building models of predicted customer profiles further comprises the step of using a propensity model to determine how likely a customer is to default on an account.

7. A method according to claim 1 wherein said step of building models of predicted customer profiles further comprises the step of using a payment behavior prediction model to estimate risk.

8. A method according to claim 1 wherein said step of building models of predicted customer profiles further comprises the step of using a client prospecting model for business development.

9. A method according to claim 1 wherein said step of generating scores for a prospective customer further comprises the step of guiding a user to optimize marketing campaign selections based on criteria from a customer database.

10. A method according to claim 1 wherein said step of using the online analytical processing tool and the customer demographic data further comprises using the online analytical processing tool and the customer demographic data to analyze each combination of the models based on at least one of risk, attrition, and profitability.

11. A system configured for targeting market segments comprising:
  a customer database for storing a plurality of prospective customers;
  a graphical user interface for entering marketing campaign data; and
  models of predicted customer profiles based upon historic data that are embedded on an online analytical processing tool, the models include risk models and marketing models, each model is a statistical analysis for predicting a behavior of a prospective customer to a marketing campaign, wherein a risk model predicts a likelihood of whether the prospective customer will at least one of pay on time, be delinquent with a payment, and declare bankruptcy, and wherein the marketing models include a net present value/profitability model, a prospect pool model, a net conversion model, an attrition model, a response model, a revolver model, a balance transfer model, and a reactivation model, said online analytical processing tool configured to:
    analyze a combination of said models, each model combination includes a risk model and at least one of the marketing models,
    determine a sequential order for combining said models prior to combining said models based on the model combination analysis, combine said models in the determined sequential order, wherein combining said models in the determined sequential order includes defining a target group of prospective customers from the plurality of prospective customers stored in said database, the target group including a list of prospective customers satisfying each of the combined models, the determined sequential order maximizes a number of prospective customers included within the target group, and
  generate scores for each prospective customer included within the target group based on said predicted customer profiles by combining said models in the determined sequential order, the scores representing at least one of a probable response by a customer to the marketing campaign, attrition of the customer, and risk associated with the customer.

12. A system according to claim 11 wherein said models are embedded in said online analytical processing tool that takes the form of a multidimensional structure.

13. A system according to claim 12 wherein said model has dimensions comprising risk, attrition, and profitability.

14. A system according to claim 12 wherein said model is a payment behavior prediction model used to estimate risk.

15. A system according to claim 12 wherein said model is a client prospecting model used for business development.

16. A system according to claim 11 wherein said models of predicted customer profiles further comprise a propensity model used to supply predicted answers to questions.

17. A system according to claim 16 wherein said propensity model determines how likely a customer is to close an account early.

18. A system according to claim 16 wherein said propensity model determines how likely a customer is to default on an account.

19. A system according to claim 11 further configured to guide a user to optimize marketing campaign selections based on criteria from a customer database.

20. A method for increasing efficiency of a marketing system, the system comprising a database containing a plurality of prospective customers and customer demographic data, said method including the steps of:
  building models of predicted customer profiles, the models include risk models and marketing models, each model is a statistical analysis for predicting a behavior of a prospective customer to a marketing campaign, wherein a risk model predicts a likelihood of whether the prospective customer will at least one of pay on time, be delinquent with a payment, and declare bankruptcy, and wherein the marketing models include a net present value/profitability model, a prospect pool model, a net conversion model, an attrition model, a response model, a revolver model, a balance transfer model, and a reactivation model;
  embedding the models within an online analytical processing tool;
  utilizing the online analytical processing tool and the customer demographic data to analyze each combination of the models, each model combination includes a risk model and at least one of the marketing models;
  determining a sequential order for combining the models prior to combining the models based on the model combination analysis performed by the online analytical processing tool;
  using the online analytical processing tool to combine the models in the determined sequential order, wherein combining the models in the determined sequential order includes defining a target group of prospective customers from the plurality of prospective customers stored in the database, the target group including a list of prospective customers satisfying each of the combined models, the determined sequential order maximizes a number of prospective customers included within the target group; and
  generating scores for each prospective customer included within the target group based on the predicted customer profiles wherein the online analytical processing tool generates the scores by combining the models in the determined sequential order, the scores representing at least one of a probable response by a customer to the marketing campaign, attrition of the customer, and risk associated with the customer.

21. A system according to claim 11 wherein said online analytical processing tool is further configured to analyze each combination of said models based on at least one of risk, attrition, and profitability.

* * * * *